United States Patent [19]

Hoecker

[11] Patent Number: 5,325,441
[45] Date of Patent: Jun. 28, 1994

[54] METHOD FOR AUTOMATICALLY INDEXING THE COMPLEXITY OF TECHNICAL ILLUSTRATIONS FOR PROSPECTIVE USERS

[75] Inventor: Douglas G. Hoecker, Monroeville, Pa.

[73] Assignee: Westinghouse Electric Corporation, Pittsburgh, Pa.

[21] Appl. No.: 828,834

[22] Filed: Jan. 31, 1992

[51] Int. Cl.$^5$ .................. G06K 9/34; G06K 9/00; G06K 9/62
[52] U.S. Cl. .................. 382/1; 382/9; 382/36; 395/54; 395/600
[58] Field of Search .............. 382/61, 1, 9, 36, 41, 382/56; 395/600, 54, 158, 160; 358/467

[56] References Cited

U.S. PATENT DOCUMENTS

| | | | |
|---|---|---|---|
| Re. 33,316 | 8/1990 | Katsuta et al. | 364/521 |
| 4,503,556 | 3/1985 | Scherl et al. | 382/9 |
| 4,504,972 | 3/1985 | Scherl et al. | 382/51 |
| 4,506,342 | 3/1985 | Yamamoto | 395/600 |
| 4,513,442 | 4/1985 | Scherl | 382/49 |
| 4,758,980 | 7/1988 | Tsunekawa et al. | 395/600 |
| 4,764,971 | 8/1988 | Sullivan | 382/9 |
| 4,853,971 | 8/1989 | Nonura | 382/56 |
| 5,010,581 | 4/1991 | Kanno | 382/56 |
| 5,129,011 | 7/1992 | Nishikawa et al. | 382/9 |

OTHER PUBLICATIONS

William M. Newman, Principles of Interactive Computer Graphics, 1979, pp. 219–221.

Primary Examiner—David K. Moore
Assistant Examiner—Michael Cammarata
Attorney, Agent, or Firm—Staas & Halsey

[57] ABSTRACT

A method for automatically measuring the complexity of a technical illustration for prospective users involves converting (50, 52, 54) the technical illustration into compressed data and measuring (60, 66, 70, 72, 74, 78, 80, 82, 86, 88, 92, 94, 96) conversion of the technical illustration into compressed data, to obtain a performance value (94) corresponding to the complexity of the technical illustration (10). This process includes, for example, the step of processing (50, 52, 54) a technical illustration with image-processing software that processes the technical illustration (10). The process further includes embedding measurement operations (60, 66, 70, 72, 74, 78, 80, 82, 86, 88, 92, 94, 96) at predetermined locations in the software to evaluate a selected task performed by the software during the processing (50, 52, 54) of the illustration. The measurements obtained are used to calculate a performance value (94) indicative of the performance of the software in processing the illustration (10). The performance value is utilized to produce a complexity value (96) representative of the visual complexity level of the technical illustration (10).

14 Claims, 6 Drawing Sheets

DATA COMPRESSION ALGORITHM FLOWCHART

METHOD FOR AUTOMATICALLY INDEXING THE COMPLEXITY OF TECHNICAL ILLUSTRATIONS FOR PROSPECTIVE USERS

BACKGROUND OF THE INVENTION

1. Field of the Invention

This invention relates generally to a method for determining the complexity of illustrations to be displayed and, more particularly, to a method for automatically indexing the complexity of technical illustrations for prospective users by measuring the performance of software which processes the illustrations.

2. Description of the Related Art

In order to effectively operate and maintain any complex equipment system, system personnel must have ready access to usable technical data, in either hardcopy or on-line form, which adequately describes both the operation of the overall system and the operation of the individual pieces of equipment forming the system. The technical data relied on by prospective users, such as system operators and personnel assigned to maintain the system equipment, is normally provided by system designers or authors in the form of one or more technical manuals. It can be appreciated that since in many cases the equipment itself is extremely complex, these manuals must necessarily include both a textual description of the equipment operating and maintenance features, and one or more pictures, drawings or schematics of the equipment which accompany the text. These pictures, drawings or schematics are referred to as "technical illustrations."

Since the technical illustration is, in most cases, critical to an overall understanding of the textual material, and provides essential visual data for training, operation, maintenance or repair of system equipment, the technical illustration must be presented by the author in a format which is both easily understood and readily usable by prospective users.

Recognizing the importance of readily understandable and usable technical illustrations, the author is faced with a choice when preparing the illustration. The author recognizes that the cost of developing readily understandable illustrations is tradable, within limits, against the fact that inexpensive but partially or totally incomprehensible illustrations necessarily result in added costs due to ineffective system operation and unnecessary maintenance costs due to lack of illustration clarity. Thus, the author strives to prepare technical illustrations which, in and of themselves, are readily understandable by the intended user. In addition, the author recognizes that well-designed technical illustrations are also indispensable to the effective use of the textual documents which accompany the illustrations.

Although the need for technical illustrations which may be readily understood is well recognized by the illustration author, it is sometimes difficult for the author to determine a minimum complexity level required of a technical illustration to effectively convey sufficient information to the intended user group. From the viewpoint of the illustration author, the level of illustration complexity is important since complexity affects illustration costs and production time. A corollary of this is that productive utilization of technical illustrations becomes more feasible as the illustrations become optimally informative and the numbers of illustrations required to convey sufficient information are reduced.

From the viewpoint of the illustration user, the complexity of the technical illustration is a function of the inherent complexity of the equipment pictured in the illustration, coupled with the level of detail included. Illustration complexity is significantly influenced by other variables, such as task difficulty, spatial organization of a given set of details, and the level of user sophistication in the task at hand.

For the illustration author, determining the level of prospective user sophistication is critical to a determination of the complexity or amount of detail to be presented in the illustration. On the one hand, novice users benefit from more detail, redundancy and primitive expression than do expert users. Conversely, the performance of an expert may actually be degraded, and a novice may be delayed in becoming an expert, if the only available format for a given set of technical data in illustration form encourages rote imitation without a higher-level understanding of the underlying principles of function or operation of the equipment depicted.

Since system designers or authors frequently do not have the resources or time to create different sets of technical illustrations for different prospective user groups, it can be seen that selecting an optimum technical illustration complexity level for all possible user groups is indeed a difficult task.

Therefore, there is a need for a method for automatically determining and indexing the complexity level of a technical illustration which may be utilized by system authors during preparation and storage of the illustration for future printing. The method should provide an overall index of the complexity of the illustration to permit the author to tailor the illustration to its intended user group. It should be possible to implement the method either during the formation of the technical illustration, or after the illustration has been completed. In addition, it should be possible to implement the method independently of the actual production of the illustration.

SUMMARY OF THE INVENTION

An object of the present invention is to measure the visual complexity of a graphic illustration.

Another object of the present invention is to count the number of line or edge segments with which a graphic illustration is represented.

An additional object of the present invention is to measure the length of time necessary to convert a pixel data representation of a graphic illustration into segments representing the graphic illustration.

It is also an object of the present invention to measure the length of time necessary to convert a segment representation of a graphic illustration into a vectors representing the graphic illustration.

This invention discloses a method for automatically indexing the complexity of pictorial data, or technical illustrations, such as line drawings, charts or diagrams, presented in either on-line or hard copy form. It has been found that this automatic indexing method has significant potential for numerous applications relating to the design and production of technical illustrations such as:

1) an authoring tool for illustration design;
2) an evaluation tool for comparing alternative approaches to illustration formatting and layout;
3) an evaluation tool for measuring the operation of software utilized to display the technical illustration;

4) a means for predicting user rating of the data's cognitively-useful attributes such as complexity, comprehensibility or utility; and 5) a specification standard for measuring contractual performance in the design and production of technical documentation including illustrations.

In accordance with the present invention, there is provided a method for automatically indexing the complexity of a technical illustration which includes the steps of converting the technical illustration to compressed data and measuring the conversion of the technical illustration to generate a performance value for the compression as a function of the evaluated task. For example, the conversion of the technical illustration into segments is measured by counting the number of segments and accumulating the time for each segment. The conversion of the segments to vectors is measured by accumulating the time for each segment. The performance value generated by the self-measurement program is converted therein to a complexity value representative of the complexity of the technical illustration.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
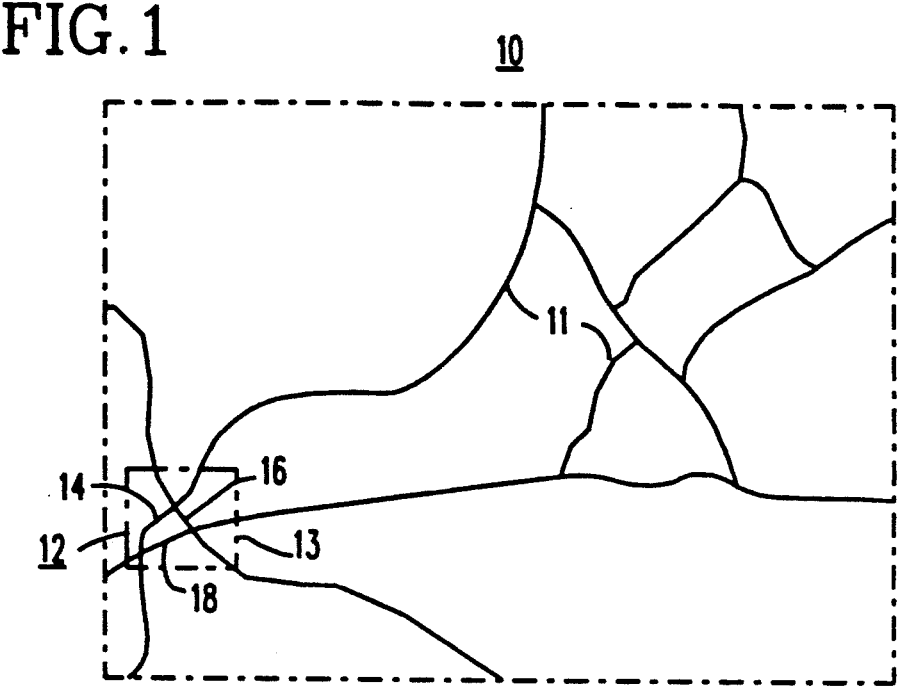
FIG. 1 is an example of one type of technical illustration which may be generated by conventional image-processing software and evaluated utilizing the method of the present invention to automatically determine its complexity to a prospective user.

The invention disclosed herein is a basic method for automatically indexing or measuring the complexity of displayed pictorial data such as line drawings, charts, diagrams, or other types of illustrations that appear in technical documentation, whether in on-line or hard-copy form. The method may be implemented with any type of image-processing software that stores images as pixels or as vectors. The method provides a complexity rating for the technical illustration that correlates highly with human assessments of the same illustration.

It should be noted that the method of the present invention may be utilized with any conventional or commercially available image-processing software that comprises raster or pixel based images. Thus, although the method will be applied herein to only two types of technical illustrations, it should be understood that this is done for explanatory purposes only, and the explanation of the method is not intended to be limiting. Generally, the method may be applied to a broad range of image-processing operable to generate, compress, store and regenerate many types of technical illustrations, and may be applied to image-processing systems having more generic characteristics than the specific image-processing features of the compression system described herein. Further, since this method may be used with many types of commercially available image-processing systems operable to manipulate technical data in a preselected manner to generate a technical illustration, the steps in a typical image-processing operation will be referred to herein only as the operations pertain to the present invention.

This method is operable to measure the complexity of a line-drawn illustration or other technical illustration to a prospective user by automatically generating a numeric value which identifies the degree of visual complexity of the illustration. This is done by adding measurement-creation enhancements to processes for parsing illustrations, such as those used to prepare illustrations for compact storage, rapid transmission, or artificially-intelligent manipulation.

More specifically, this process can be performed by inserting counting and measuring steps in the image-processing software that cause the software to measure or evaluate complexity as it processes, for example, a data file containing a pixel representation of the illustration whose complexity is to be rated. These instructions are inserted at predetermined places or locations in the software (instruction format and placement are functions of software format and operation), and the measures they produce will automatically identify the illustration's complexity to a prospective user. Although both the form of the individual selfmeasurement instructions and the placement of the instructions in the software will be determined by the operating format of the software, an example of how particular instructions can be inserted in particular locations into one type of software, an image compression algorithm, will be described later in greater detail.

One example of the type of technical illustration which may be generated by conventional image-processing software and processed utilizing the method of the present invention to automatically determine its complexity to a prospective user is illustrated in FIG. 1 and is generally designated by the numeral 10. Technical illustration 10 is a maplike illustration formed from a plurality of individual lines or branches, some of which are designated by the numerals 11. The operation of the method for determining the complexity of map-type illustration 10 will be described herein with reference to a portion 12 of illustration 10, and it should be understood that in practice the method may be applied to the entire illustration.

Figure 2:
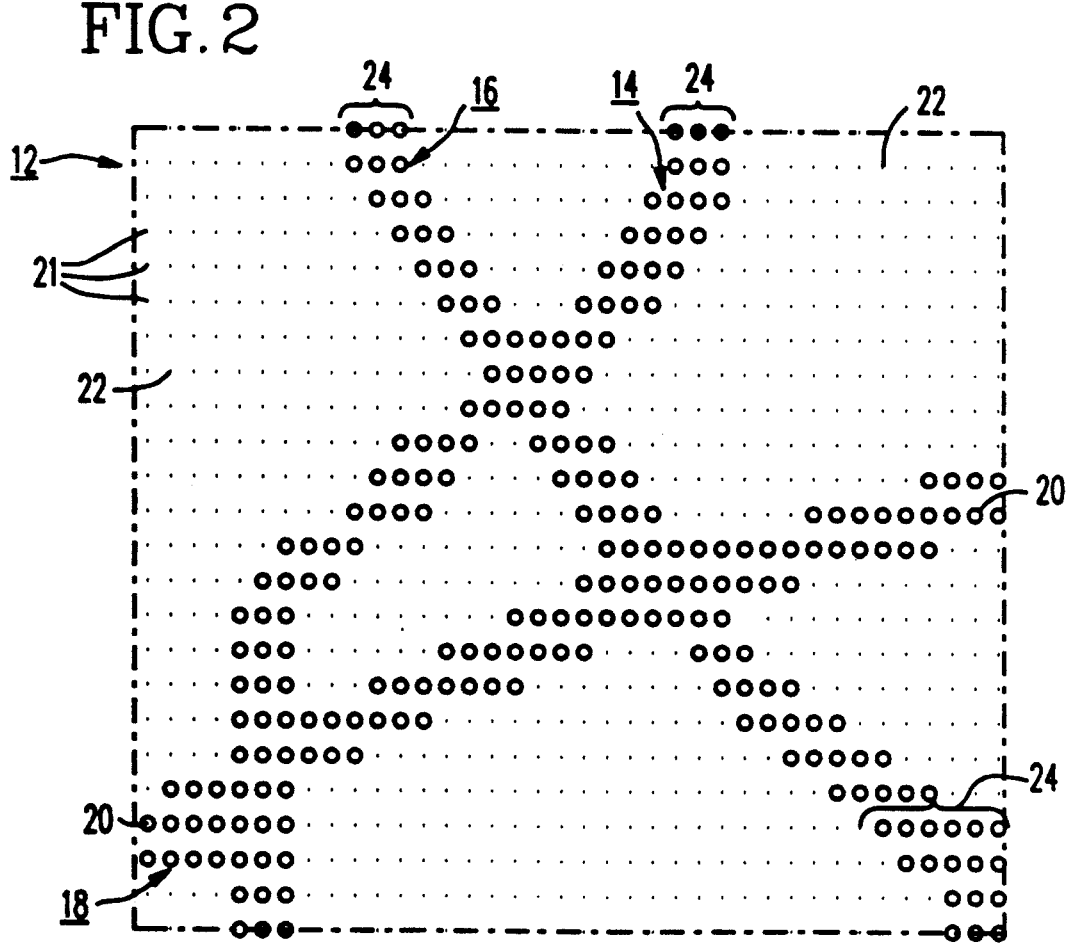
FIG. 2 is a pixel representation of a portion of the technical illustration of FIG. 1.

Referring to FIG. 2, there is illustrated the portion 12 of map-type illustration 10 previously referred to in FIG. 1. The portions of the intersecting lines or branches 14, 16, 18 contained within the boundary 13 of portion 12 illustrated in FIG. 1 are each represented in FIG. 2 by a plurality of individual pixels 20. The lines 14, 16, 18 illustrated in FIG. 2 and represented by the plurality of pixels 20 are generated in a wellknown manner utilizing an image-processing software package including a raster image processor. As previously described, image-processing software capable of generating the pixel representation of map-type illustration 10 as shown in FIG. 2 is itself known in the art and commercially available.

Generally speaking, the image-processing software includes a raster image processor utilized to generate the pixel-level representation of portion 12 of map-type technical illustration 10 and capable of scanning monochrome pictorial data requiring high resolution reproducibility (4,000 pixels/line). The image processing software also includes conventional compression software which is then used on the pixel image. The function of this compression software is to reduce the storage/transmission requirements for electronically manipulated pictorial data such as blueprints, electronic diagrams, chip layouts, and line-type drawings.

Figure 3:
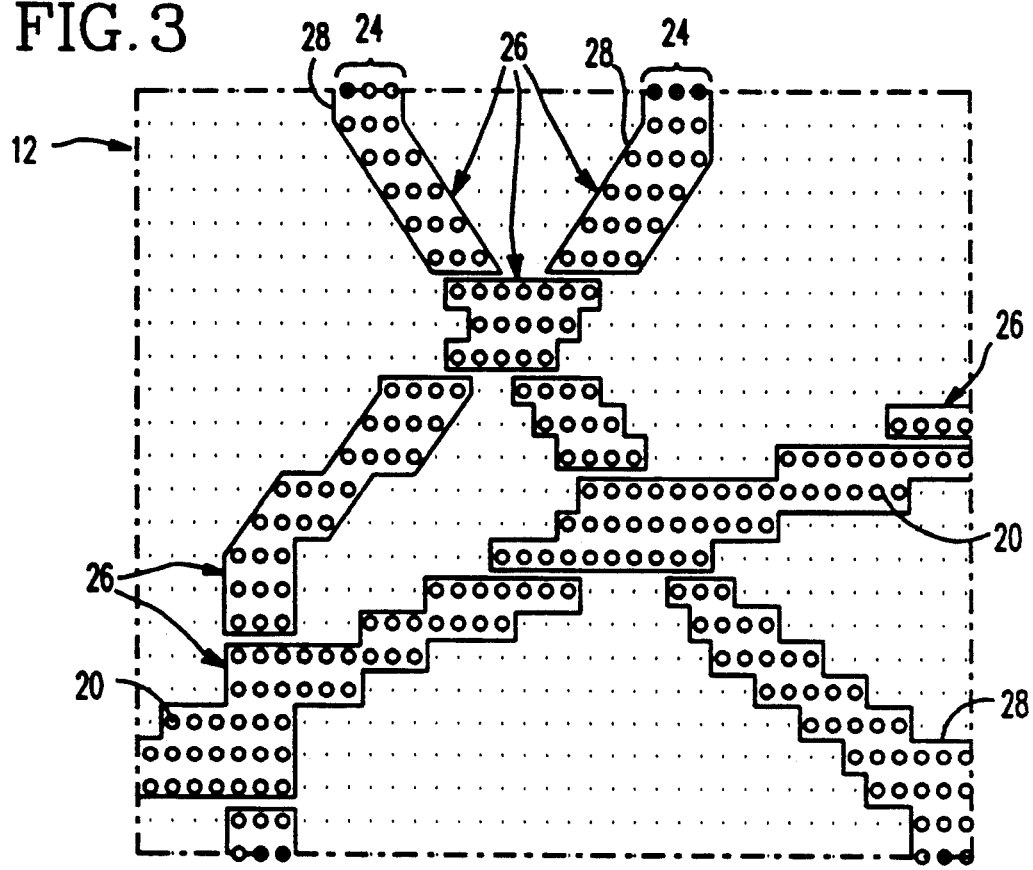
FIG. 3, which is similar to the pixel representation of FIG. 2, illustrates the segmentation of a plurality of individual pixels into a plurality of discrete pixel regions.
Figure 4:
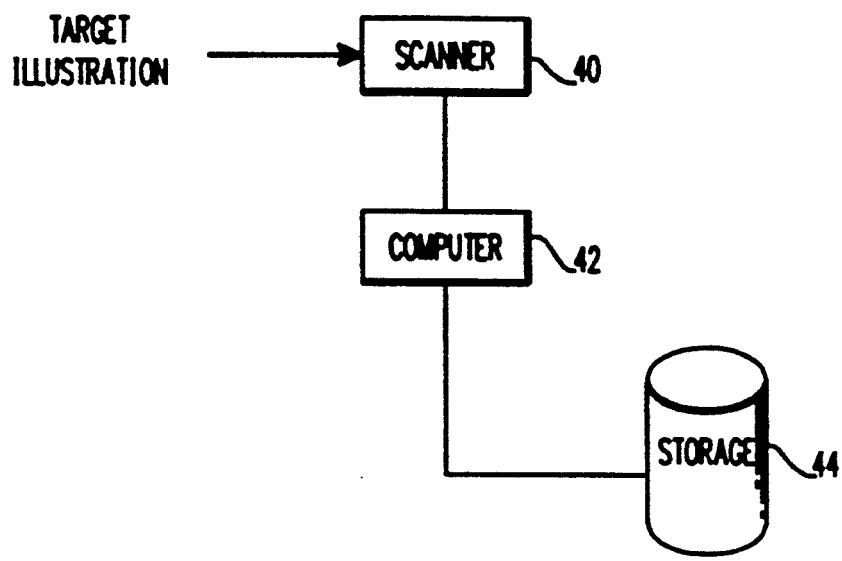
FIG. 4 is an illustration of the hardware for performing the image processing on which the present invention is based.

For example, as shown in FIG. 4, a scanner 40, such as a laser scanner or a CCD array, as controlled by a raster image processor or computer 42 scans the target illustration and inputs pixel data representing pixels 20 as shown in FIGS. 2 and 3, to the computer 42. The computer 42 runs image-processing software such as the data compression software package described above. The data compression software converts the pixel data into segment data, as will be described in greater detail, and then converts the segment data into vector polygon data, as will also be described in greater detail. By compressing the pixel data into vector polygon data, the image can be represented and stored much more efficiently in the storage 44. When regeneration of the image is required, pixel data can be obtained from the vector polygon data by the image-processing software run by the computer 42. An example of such a conversion to pixel data is disclosed on pp. 219–220 of Principles of Interactive Computer Graphics, Second Edition, by W. M. Neuman (1979).

Figure 5:
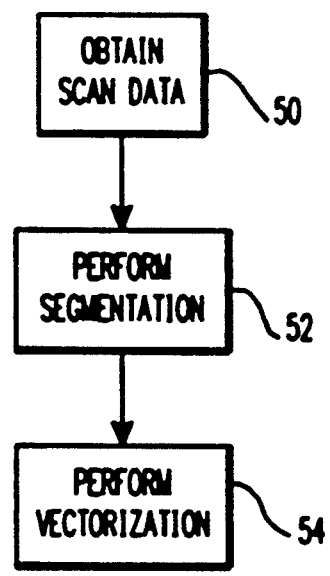
FIG. 5 is a flowchart of a data compression algorithm.

A general flowchart of the data compression algorithm executed by the computer 42 is shown in FIG. 5. First, the scan data is obtained 50 from the scanner 40 which is, for example, a laser scanner. As the laser scans the target illustration, which in this case is the portion 12 of the map-type illustration 10, light and dark reflections are detected by photomultipliers or photodiodes whose output voltages are then conventionally converted into binary bits to be recorded at the corresponding locations in a raw data file in storage 44. Time for this stage of the process is on the order of 60 seconds for an 8½"×11" line drawing. The portion 12 of map-like illustration 10 illustrated in FIG. 2 consists of a plurality of individual "mark-present" pixels 20 superimposed on neighboring scan lines 21 each represented by a plurality of dots 22. Lines from the original pictorial image are indicated by continuous regions 24 of "line-present" pixels 20 that may be oriented across the scan lines 21 or parallel with them.

As shown in step 52 of FIG. 5, the data-compression software is further operable to decompose the raw matrix formed from the plurality of individual pixels into associative segments. Each of the segments is illustrated in FIG. 3 by the numeral 26. The decomposition of the raw matrix formed from the plurality of individual pixels 20 into a plurality of associative segments 26 operates on the principle of differencing to reduce the data required to represent the plurality of continuous regions 24 in storage 44. Essentially, the program decides on the basis of proximity criteria if a "mark-present" pixel 20, in a given region 24 on a particular scan line, is close enough to another such pixel in a previous region 24 on an adjacent scan line to identify both regions as part of the same segment on the original illustration. If it is, the position of the pixel in the second region can be represented as the difference between the two regions and the remaining spaces between pixels are discarded. "Mark-present" pixels that can be associated in this manner are associated in a subsequent working file. The image-processing software handles individual scan lines independently, but when two scan lines intersect as shown in FIGS. 2 and 3, the intersection is identified as a separate segment until, on subsequent scans, the software determines that two separate scan lines or segments can again be unambiguously detected. At this point, two independent segments are processed until they end or another ambiguous region is encountered.

As illustrated by 54 of FIG. 5, after the raw matrix formed from the plurality of individual pixels 20 is decomposed into a plurality of associative segments 26, the outer boundaries of each of the segments 26 is converted by the image-processing software to a series of vector polygons. Conceptually, the result is represented in FIG. 3 by the plurality of segments 26 and vector polygon boundary markers 28. Data concerning all the individual pixels 20 inside each of the segment boundary markers 28 is discarded by the data-compression software, until such time that regeneration of the technical illustration is required. At this time, the individual pixels within each of the segments 26 may be regenerated utilizing a conventional fill-in algorithm.

In the present invention, the complexity of an illustration is determined based on measurement operations inserted into the compression process, and calculation of the value complexity is performed by the measurement operations. For example, to determine the complexity of the portion 12 of map-type technical illustration 10, three measurement operations which form a measurement program are inserted into the data-compression processor. The first operation is a counting operation which counts the number of "mark-present" or "line-present" segments into which the raw matrix formed from the plurality of pixels 20 is compressed. The second operation is a timer operation which measures the amount of elapsed time required to perform the segmentation phase. The third operation is a timer which measures the amount of time required to perform the vector polygon compression phase.

Figure 6:
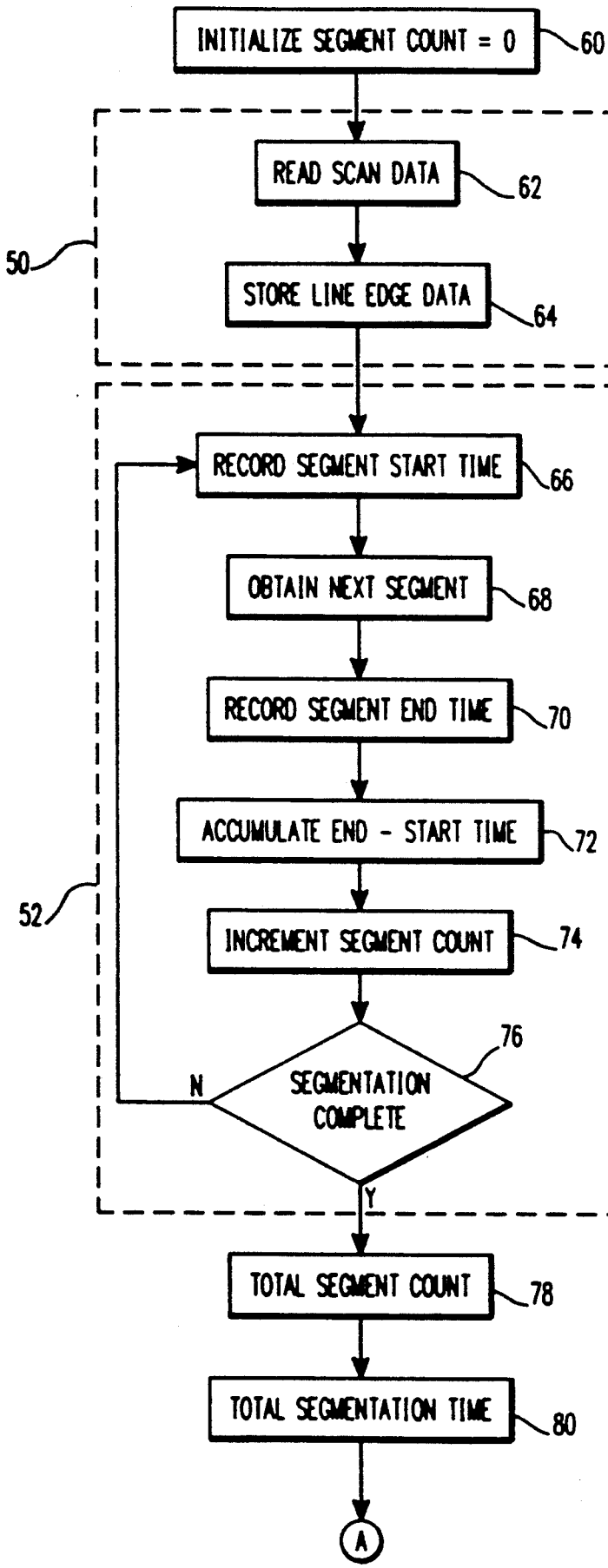
FIGS. 6 and 7 are flowcharts of the data compression algorithm with the self-measurement instructions of the present invention inserted therein.
Figure 7:
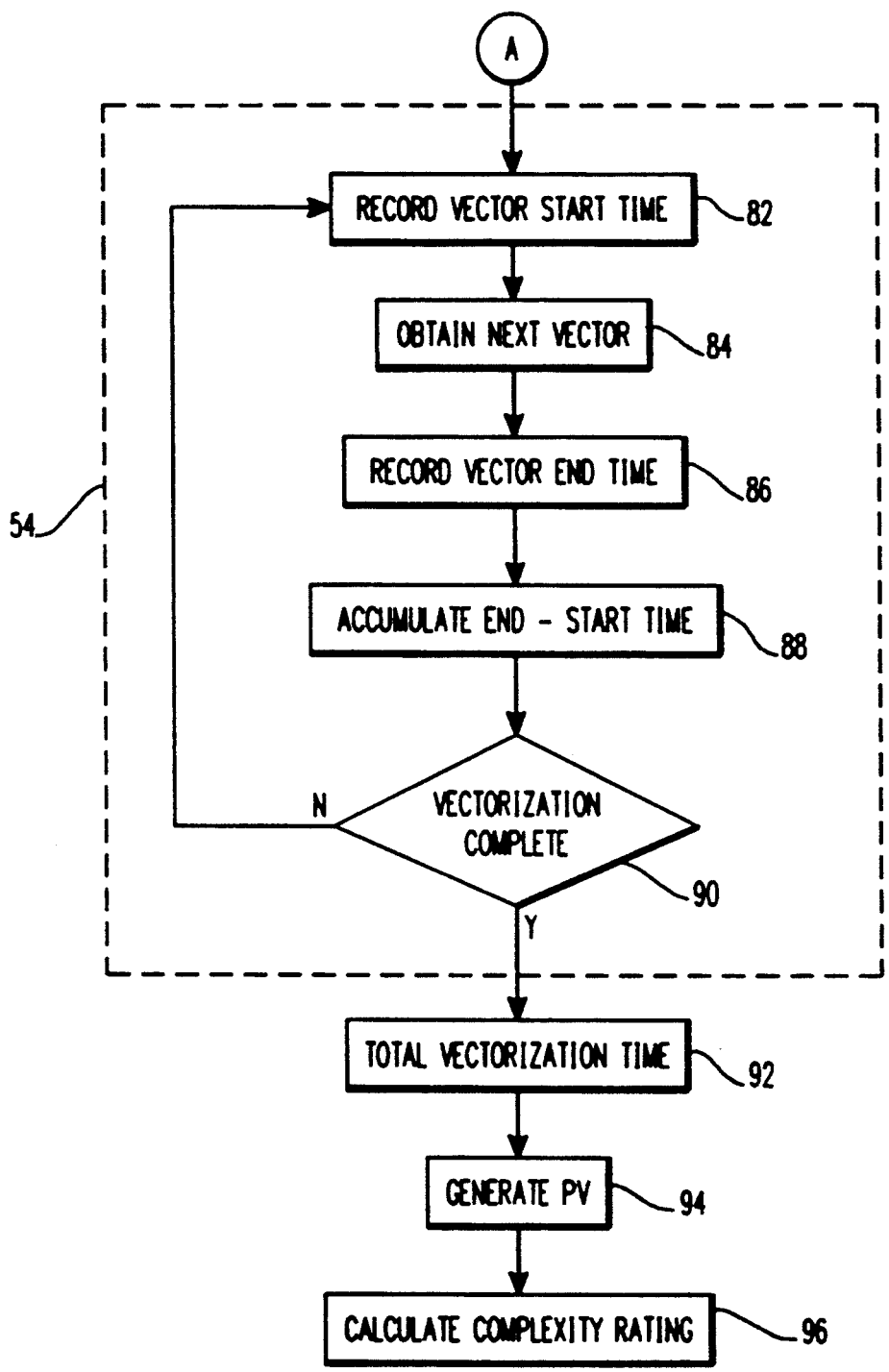

A detailed example of how these self-measurement operations relate to the datacompression software is shown in FIGS. 6 and 7. The flowchart in FIGS. 6 and 7 includes an example of the types of measurement instructions that can be inserted into image processing software, and of the predetermined locations into which these measurement instructions can be inserted.

In the flowchart shown in FIGS. 6 and 7, steps 62, 64, 68, 76, 84 and 90 represent steps performed by the data processing compression of conventional image processing software. Steps 60, 66, 70, 72, 74, 78, 80, 82, 86, 88, 92, 94 and 96 represent instructions added to the software to perform the self-measurement necessary to obtain a complexity rating of the illustration in accordance with the present invention.

First, a segment count is initialized in step 60 to zero so that it can be accumulated as each segment is obtained to indicate the total number of segments created by the data compression software. The scan data is read 62 in from the laser scanner 40 and line edge data is stored 64 which indicates the leading edge (LE) and trailing edge (TE) of each line encountered by each scan line up to the end of the line (EL). For example, a scan of the area shown in FIG. 8 would yield line edge data of $LE_{11}$, $TE_{11}$, $LE_{12}$, $TE_{12}$, $LE_{21}$, $TE_{21}$, $LE_{22}$, $TE_{22}$, where $LE_{11}$ is the position in the matrix of raw pixel data of the leading edge of a line of mark present pixels and $TE_{11}$ is the position in the matrix of raw data of the trailing edge of the line of mark present pixels detected by determining the first and last of a continuous sequence of mark present pixels.

Figure 8:
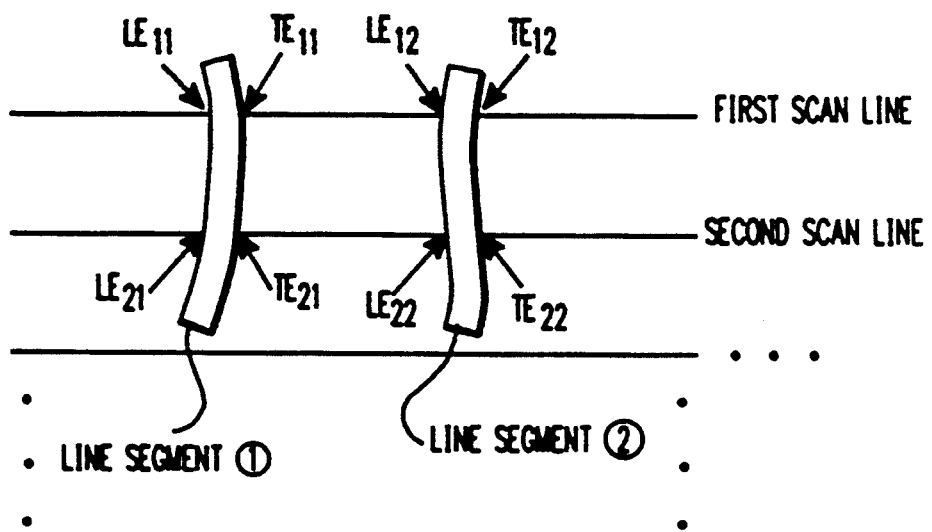
FIG. 8 is an illustration of a line scan operation and the data obtained thereby.

Next, at the beginning of the segmentation process 52, the segment processing start time is recorded 66 by storing the current computer clock time. Then, the first segment is obtained 68 in accordance with the data compression software. Segments are obtained, for example, by arranging the line edge data into blocks. For example, line segment 1 in FIG. 8 is represented by a block of ($LE_{11}$ $TE_{11}$ $LE_{21}$ $TE_{21}$), and line segment 2 is represented by a block of ($LE_{12}$ $TE_{12}$ $LE_{22}$ $TE_{22}$). An LE-TE point pair is grouped with that of the preceding scan line, that is, added to the block defining or bounding the segment, if the LE-TE point pair overlaps the midpoint of the LE-TE point pair from the preceding line. If so, that pair is added to the block representing a line segment. If not, continuity fails and the segment is ended. After the first segment has been obtained, the segment processing end time is recorded 70 by storing the current computer clock time. The difference between the end and start time is calculated and this difference is accumulated 72. Then, the segment count is incremented 74. If there are more segments to be obtained 76, then steps 66 through 74 are repeated, incrementing the segment count for each segment, and further accumulating the segmentation time taken to obtain the segments.

After segmentation is complete 76, the segment count produced by the incrementations during the segmentation process is stored 78 as the total segment count 78. Also, the segmentation time produced by accumulating the segmentation time for each segment is stored as the total segmentation time.

At the beginning of the vectorization process 54, the vector start time is recorded 82 by storing the current computer clock time. Then, the first vector is obtained 84 in accordance with the data compression software. Namely, for each line segment (represented by each block) an initial incremental vector is obtained based on the first few LE points, such as the first four points. Then, the rest of the LE points in the segment are checked for co-linearity within a specified tolerance. That is, it is determined whether the slope of a hypothetical line drawn through the LE points is maintained, within a specified tolerance which takes into account the imperfection of the scan data representation. The tolerance can be determined in many ways. For example, it can be arbitrarily set at a fixed slope or a variable tolerance can be set. A variable tolerance could be determined by picking the smallest of the difference between the LE point values of the first and fourth lines and the difference between the LE point values of the fourth and eighth lines. For each point, if co-linearity exists, the vector is extended; if not, the vector is ended and a new vector is formed. The same process is performed for the TE points.

The beginning and end points of all vectors of a segment are marked by, for example, setting a bit for each LE or TE point to "1". Then the XY coordinates for each vector are recorded or stored. Because the vectors in a polygon form a closed loop, each vector is represented by only its end point.

After each vector is obtained, the vector processing end time is recorded 86 by storing the current computer clock time, and the difference between the vector pressing end and start times is calculated and then accumulated 88 as vectorization time. At the completion of the vectorization process 90, the time produced by accumulating the vectorization time for each vector is stored as total vectorization time 92.

The data generated by each of the measurement operations represents an evaluation of the illustration obtained during the compression software operations and may be utilized, either alone or in combination, to generate a performance value 94 for the compression software. The performance value is generated utilizing linear correlation techniques, which are well known to those skilled in the art.

For example, to utilize the data generated by the self-measurement instruction whose task is to register the amount of elapsed time for the data-compression software to identify individual segments in the pixel matrix, known linear correlation techniques may be employed to produce a performance value (PV).

That is, the linear regression analysis formula $y = ax + b$ can be applied based on a correlation between an expected human rating (y) and a value measured by the computer (x), to obtain a performance value PV representative of the complexity (or comprehensibility) of the illustration, as follows:

$$PV = 0.06x + 2.37$$

The value x could represent any measurement of the performance of the vector processing software, such as the total segment count or vectorization time, or any combination of these measurements.

In this case the value x represents the total segmentation time computed in step 80 of FIG. 6. Also in this case, the linear regression slope a $=0.06$ and y-intercept value b$=2.37$ are provided as an example for the a and b values in the well-known linear regression formula. These values are of course specific to the linear processing software and hardware used, and the performance value range desired for PV. The values a and b can be produced by providing a sufficient number of actual human ratings (within the range in which PV is intended to be maintained) and providing a set of paired test values for each computer value x and human rating PV, to produce a reasonably accurate linear correlation curve to express the desired correlation between the computer-generated measurements and human ratings of the illustrations.

After the performance value of the data-compression software is determined 94, a complexity rating is calculated 96, so that the performance value rating is correlated to a psychologically meaningful index of the visual complexity of the illustration to a prospective user. It has been found that a scale such as illustrated below in chart 1, which may also be incorporated into the measurement program, can be utilized to interpret the performance value (PV) as a numerical rating identifying the amount of detail or complexity of the illustration

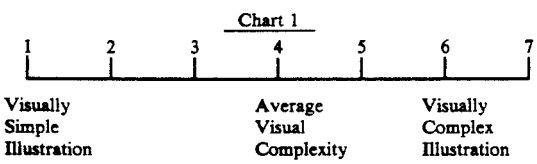

The scale ranges from a minimum value of "1", indicating a visually simple technical illustration, to a maximum value of "7" which indicates that the technical illustration is visually complex to the point that excessive detail is presented in the illustration.

As described, measurement operation may be inserted in the image-processing software, such as an image compression algorithm, to evaluate the complexity of the technical illustration being generated by the software. Although one example of such measurement operations has been set forth herein, it should be understood that these operations and their positioning within the image-processing software are dependent upon the image-processing software itself. Therefore, the nature and placement of the instructions may vary in a specific sense, although the general principle is the same. Thus, in principle this method may be used with other units of measure beyond those described above. The measures selected should be both psychologically meaningful in the context of the task to be performed and appropriate to the level of analysis at which the software operates.

Determining the complexity of the technical illustration is extremely useful to allow the illustration author to tailor the illustration's complexity to the relevant skill of the illustration user. Whether the user is a novice or an expert in the technology area displayed in the illustration, the author may utilize the method disclosed herein to ensure that the illustration includes enough detail to be of "average visual complexity". In other words, the author will include enough detail in the illustration so that the illustration has a numerical rating of around "4" as shown in chart 1. This of course assumes that values of a and b were obtained through a rating process that would assign a "4" to an illustration with that corresponding machine score. For example, if the illustration is to be used by untrained or relatively unskilled technicians, the author of the illustration will include enough detail to make the illustration of average visual complexity to the unskilled technician. If the ultimate user of the illustration is of average skill, the illustration author will again include enough detail to make the illustration of average visual complexity to the technician of average skill. Finally, if the ultimate user of the technical illustration is an expert in the field to which the illustration relates, the author will include enough detail to make the illustration of average visual complexity to the expert.

As described, by utilizing the method of the present invention, the illustration author may include enough detail in the illustration so as to tailor the illustration's complexity to the level of skill of the intended user group. Since the untrained or unskilled technician and the expert can visually assimilate only a certain amount of visual information at one time, the author, by utilizing the method of the present invention, may avoid cluttering the illustration and achieve an optimum illustration complexity level on a sliding scale dependent on the level of skill of the intended user. As the level of skill increases from the unskilled to the expert, the author may include more detail in the illustration and still provide an illustration which is relatively uncluttered and of average visual complexity to the intended user.

Although three separate measuring operations are described herein as forming the measurement program utilized to determine the complexity level of portion 12 of map-like illustration 10 to an intended user, it will be appreciated by those skilled in the art that other measurement operations may be utilized to generate a performance value for the image-processing software as the software generates the technical illustration. For example, since the portion 12 of map-like illustration 10 shown in FIG. 1 is a pixel representation, the measurement operations are directed to specific tasks operable to manipulate the individual pixels during the various stages of data compression. Thus, the operations themselves are tailored to the natural operation of the software. In the above example, the natural operation of the software occurred at a perceptual level of human information processing. However, image-processing software often operates at higher levels of analysis applicable to the task context of the user of technical data. Thus, it will be appreciated by those skilled in the art that the method described and disclosed herein is also applicable to a higher, or cognitive level of analysis. An example of a higher level analysis used to determine the complexity of a technical illustration will now be explained herein with reference to FIG. 9.

Figure 9:
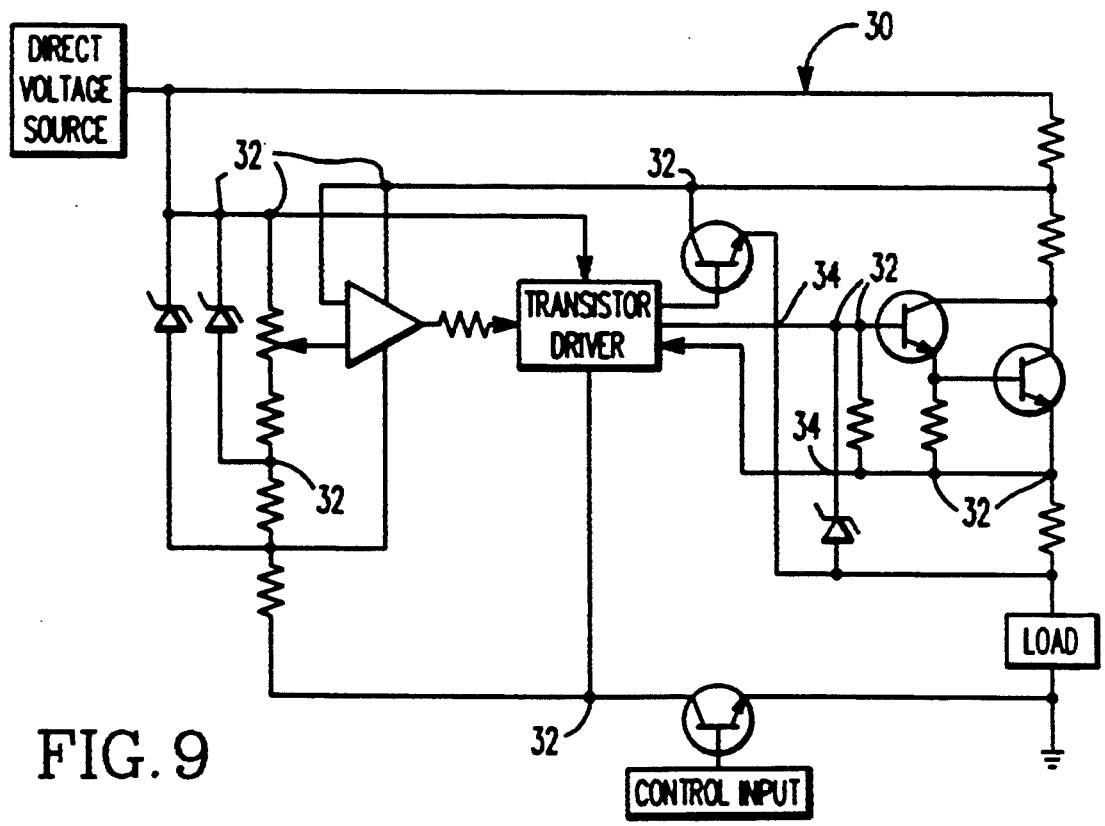
FIG. 9, which is a line-type illustration, is an example of another type of technical illustration which may be generated by image-processing software and evaluated utilizing the method of the present invention to automatically determine its complexity to a prospective user.

As seen in FIG. 9, there is illustrated an example of another type of technical illustration the complexity of which may be tailored to the level of skill of the ultimate user by means of the complexity-determining method of the present invention. Those skilled in the art will recognize circuit 30 as a schematic illustration of a DC static switch. In many instances, it may be desirable to determine the visual complexity of a schematic illustration such as illustration 30 prior to its inclusion in a technical manual. The reason for this is the author recognizes that the nature of the task to be performed utilizing the illustration interacts with the level of skill of the intended user. In other words, if the document is included in the manual to provide information relating to the maintenance or repair of the circuit itself, the author recognizes that the skill of the illustration user is most probably high since the user must be able to understand the function of each component in the circuit. On the other hand, if the circuit is illustrated to show its relationship to an overall system of which it is a part, the author recognizes that the skill level of the illustration user does not necessarily have to be high. Thus, if the purpose of the illustration is to serve as a maintenance or repair aid, the author will illustrate the actual components of the circuit and identify their component values. However, if the only information required to be conveyed regarding the circuit is its relationship to the over system, then perhaps the circuit itself may be sufficiently illustrated as a "black box" having a desired number of inputs and outputs.

If illustration 30 is to be utilized as a maintenance or repair aid, the author will be able, by utilizing the method of the present invention, to tailor the illustration's complexity level to the level of skill of the intended user. As previously described with respect to FIG. 1, whether the user is unskilled, of average skill or an expert, the author will tailor the complexity level of the illustration so that the illustration has a complexity level of approximately "4" on chart 1. Thus, the illustration may be tailored so that it is of "average visual complexity" to the intended user, whether he be unskilled, of average skill level, or an expert.

Now referring specifically to FIG. 9, the schematic illustration 30 shown therein represents a D.C. static switch, and may be generated utilizing known image-processing software techniques. Since image-processing software operable to manipulate technical data in a preselected manner to generate schematic illustration 30 is known and commercially available, a measurement program may be designed and embedded in the image-processing software itself which is capable of generating a performance value (PV) for the illustration-producing software. For example, the self-measurement program may include measurement operations at predetermined locations in the software operable to perform the task of tabulating the total number of intersections between individual lines of the schematic. Intersections between lines in schematic illustration 30 are designated in FIG. 9 by the numerals 32. If desired, measurement operations may be operable to perform the task of tabulating the total number of crossovers 34 between non-parallel lines in the schematic illustration.

If either the total number of intersections 32 between lines or the total number of crossovers 34 between non-parallel lines is determined as a result of the image-processing software following the measurement operations, the total number of intersections or total number of crossovers may be manipulated utilizing known linear (and non-linear) correlation techniques to arrive at a performance value (PV) for the schematic illustration. As previously described for the map-type illustration 10 of FIGS. 1 through 3, the performance value is thereafter compared by the measurement program to the scale previously illustrated in Chart 1 and described herein to produce a complexity value representative of the complexity of the schematic illustration to a prospective user. The complexity value identifies the complexity of the schematic illustration to a prospective user, and thus allows the author of the schematic illustration to either include additional visual material or delete a portion of the visual material illustrated depending upon the difference between the determined visual complexity value and the desired visual complexity value.

The method described herein is operable, through the application of preselected measurement techniques to any type of image-processing software, to generate an index of the visual complexity of an illustration generated by the software in terms that are psychologically meaningful to the illustration user. The method is operable to provide a complexity rating for the illustration as the illustration is being generated by the image-processing software, and this allows the illustration author to tailor the illustration's visual complexity to the level of skill of the ultimate user.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of measuring the complexity of a technical illustration, comprising the steps of:
    a) converting the technical illustration into pixel data;
    b) converting the pixel data into segment data;
    c) measuring said converting of the pixel data into segment data to obtain a performance value corresponding to the complexity of the technical illustration;
    d) converting the segment data into vector polygon data; and
    e) measuring said converting of the segment data into vector polygon data to obtain the performance value corresponding to the complexity of the technical illustration.

2. A method according to claim 1, wherein step a) includes a1) scanning the technical illustration to obtain scan data and a2) converting the scan data to the pixel data.

3. A method according to claim 1, wherein step b) includes arranging the pixel data into blocks each corresponding to a line segment in the technical illustration.

4. A method according to claim 3, wherein step c) further includes counting the number of blocks obtained in step b).

5. A method according to claim 3, wherein step c) further includes accumulating an amount of time required to obtain each of the blocks obtained in step b).

6. A method according to claim 1, wherein step a) includes a1) scanning the technical illustration to obtain scan data and a2) converting the scan data to pixel data.

7. A method according to claim 1, wherein step d) includes obtaining vectors representing a set of points in each of the segments for which co-linearity exists within a specified tolerance.

8. A method according to claim 7, wherein step 3) includes accumulating an amount of time required to obtain each of the vectors obtained in step d).

9. A method for automatically indexing the complexity of a technical illustration for prospective users, comprising the steps of:
    processing a technical illustration with image-processing software performing a task by:
        converting at least a portion of said technical illustration into pixel data; and
        converting the pixel data into segment data;
    adding preselected self-measurement instructions at predetermined locations in said image-processing software to evaluate the task performed by said image-processing software as said software processes said technical illustration;
    generating a performance value for said software as a function of said evaluated task by applying said preselected self-measurement instructions to a portion of the image-processing software which performs said conversion to the segment data, to generate said performance value for said conversion to the segment data; and
    converting said performance value into a complexity value representative of the complexity of at least said portion of said technical illustration.

10. The method of claim 9, wherein said preselected self-measurement instructions include the task of:
    determining an elapsed time required to convert the pixel data to the segment data; and
    generating said performance value as a function of said elapsed time required to convert the pixel data to the segment data.

11. The method of claim 9, wherein said preselected self-measurement instructions include the tasks of:
- identifying each segment converted by said image processing software;
- totalling the number of the segments; and
- generating said performance value as a function of said segments.

12. The method of claim 9, including the steps of:
- processing a line-type technical illustration with said image-processing software;
- applying said self-measurement instructions to said image processing software to identify intersections between lines of said line-type illustration;
- totalling the number of identified intersections between lines; and
- generating said performance value as a function of said total number of intersections.

13. The method of claim 12, wherein
- said line-type illustration is a schematic illustration of a circuit having a preselected configuration; and
- said intersections between lines represent connections between individual components of said circuit.

14. The method of claim 9, further comprising the steps of:
- processing a line-type technical illustration with said image-processing software;
- applying said self-measurement instructions to said image processing software to identify crossovers of lines forming said line-type illustration;
- totalling the number of identified crossovers between lines; and
- generating said performance value as a function of said total number of crossovers.

* * * * *